United States Patent
Poirot et al.

(10) Patent No.: US 7,243,142 B2
(45) Date of Patent: Jul. 10, 2007

(54) DISTRIBUTED COMPUTER SYSTEM ENHANCING A PROTOCOL SERVICE TO A HIGHLY AVAILABLE SERVICE

(75) Inventors: Didier Poirot, Plaisir (FR); Francois Armand, Noisy-le-Roi (FR); Stephen McKinty, Theys (FR)

(73) Assignee: Sun Microsystems, Inc, Santa Clara, CA (US)

( * ) Notice: Subject to any disclaimer, the term of this patent is extended or adjusted under 35 U.S.C. 154(b) by 845 days.

(21) Appl. No.: 10/354,334

(22) Filed: Jan. 29, 2003

(65) Prior Publication Data

US 2003/0177218 A1    Sep. 18, 2003

(30) Foreign Application Priority Data

Feb. 1, 2002    (FR)    ................... 02 01228

(51) Int. Cl.
*G06F 15/177*    (2006.01)
(52) U.S. Cl. .................... 709/220; 709/223; 709/224
(58) Field of Classification Search ............ 709/220, 709/223, 224
See application file for complete search history.

(56) References Cited

U.S. PATENT DOCUMENTS 6,249,813 B1 *    6/2001    Campion et al. ........... 709/222
6,574,197 B1 *    6/2003    Kanamaru et al. .......... 370/252

* cited by examiner

*Primary Examiner*—Zarni Maung
*Assistant Examiner*—Nghi Tran
(74) *Attorney, Agent, or Firm*—Park, Vaughan & Fleming LLP

(57) ABSTRACT

One embodiment of the present invention provides a distributed computer system comprising a group of nodes, said group of nodes having a first and a second node adapted to act as current monitor nodes, each node of the group of nodes having an identifier and a management layer being informed which node currently acts as the current monitor node. The first and second node each include a protocol server adapted to associate and to send an address to a node requesting an address in the group of nodes, and a memory adapted to store an association address-identifier of a node requesting an address. The protocol server is further capable of requesting the management layer of a node for an indication informing if said node acts as the current monitor node, and attributing, to the current monitor node, the ownership of a list of associations, said list comprising associations of the memory.

8 Claims, 9 Drawing Sheets

| C-IP<br>IP ADDRESS (C-IP) | C-ID<br>ID NODE (C-ID) | S-IP<br>SERVER (S-IP) | F<br>FLAGS | T |
|---|---|---|---|---|
| 10.1.1.50 | 01080020DA4FAC | 10.1.30.10 | | |

FIG. 6

DISTRIBUTED COMPUTER SYSTEM ENHANCING A PROTOCOL SERVICE TO A HIGHLY AVAILABLE SERVICE

RELATED APPLICATION

This application hereby claims priority under 35 U.S.C § 119 to French patent application No. 0201228, filed Feb. 1, 2002, entitled, "Distributed Computer System Enhancing a Protocol Service to a Highly Available Service."

RELATED ART

The invention relates to a distributed computer system, for example a distributed computer system providing an extensible distributed software execution environment. Such an environment is a software platform, which may be intended for management and control applications for network components. Such a platform is composed of a group of cooperating nodes, also called a cluster, some nodes having hard disk and designated as diskfull and other nodes having no hard disk and designated as diskless. Such nodes use a standard network protocol, e.g. the DHCP protocol (Dynamic Host Configuration Protocol) described in the RFC 2131, March 1997, to provide administration information from diskfull nodes, called server nodes, to requesting nodes being possibly diskless nodes, called client nodes. Used in the Internet, the DHCP protocol provides IP address, Time Zone, network routing, mail, printing information and others various resources location to requesting nodes.

Such a platform may have to be highly available. Thus, limits of the DHCP protocol concerning management of nodes appear in an environment having e.g. various server nodes, nodes needing to re-boot or being detected as failed or nodes having redundant links.

A general aim of the present invention is to provide advances towards high availability.

The invention concerns a distributed computer system comprising a group of nodes, said group of nodes having a first and a second node adapted to act as current monitor nodes, each node of the group of nodes having an identifier and a management layer being informed which node currently acts as the current monitor node. Each first and second node comprises, a protocol server adapted to associate and to send an address to a node requesting an address in the group of nodes, a memory adapted to store an association address-identifier of a node requesting an address. The protocol server is further capable of requesting the management layer of a node for an indication informing if said node acts as the current monitor node, attributing, to the current monitor node, the ownership of a list of associations, said list comprising associations of the memory of first node shared with associations of the memory of second node.

The invention also concerns a method of managing a distributed computer system having a group of nodes, each node having an identifier, and comprising a first and a second node being adapted to act as the current monitor node of the group of nodes, comprises the following steps:

a. requesting for an indication informing which one of the first or the second node acts as the current monitor node, b. attributing, to the current monitor node, the ownership of a list of associations address-identifier of nodes, this list comprising the associations from the first and second nodes, c. responsive to a reception of a request for an address of a requesting node in the first and the second nodes, associating and sending an address to the requesting node from the current monitor node, d. repeating steps a. to step c.

Other alternative features and advantages of the invention will appear in the detailed description below and in the appended drawings.

BRIEF DESCRIPTION OF THE FIGURES

FIG. 6 is a table of IP addresses stored according to the network protocol module of an embodiment of the invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Additionally, the detailed description is supplemented with the following Appendices:

Appendix A contains specific data structures and API functions;

Appendix B contains extracts of code according to an embodiment of the invention.

These Appendices are placed apart for the purpose of clarifying the detailed description, and of enabling easier reference. They nevertheless form an integral part of the description of embodiments of the present invention. This applies to the drawings as well.

This invention also encompasses embodiments in software code, especially when made available on any appropriate computer-readable medium. The expression "computer-readable medium" includes a storage medium such as magnetic or optic, as well as a transmission medium such as a digital or analog signal.

Figure 1:
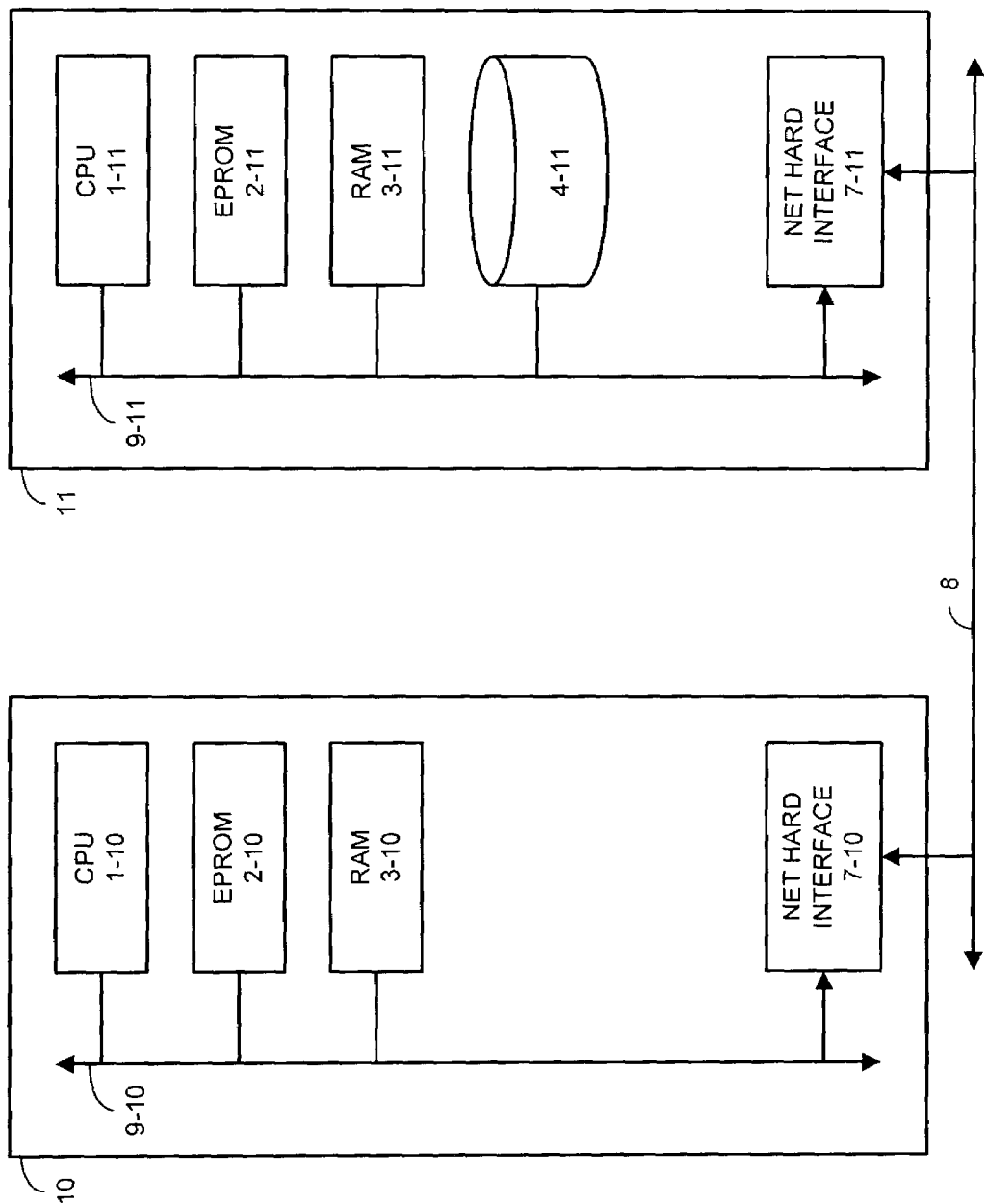
FIG. 1 is a general diagram of a distributed computer system comprising a diskfull node and a diskless node.

This invention may be implemented in a network comprising computer systems. The hardware of such computer systems is for example as shown in FIG. 1, where in the computer system 10:

1-10 is a processor, e.g. an Ultra-Sparc (SPARC is a Trademark of SPARC International Inc);

2-10 is a program memory, e.g. an EPROM for BIOS;

3-10 is a working memory for software, data and the like, e.g. a RAM of any suitable technology (SDRAM for example); and 7-10 is a network interface device connected to a communication medium 8, itself in communication with other computers such as computer system 11. Network interface device 7-10 may be an Ethernet device, a serial line device, or an ATM device, inter alia. Medium 8 may be based on wire cables, fiber optics, or radio-communications, for example.

The computer system 10 may be a node amongst a group of nodes in a distributed computer system. The other node 11 shown in FIG. 1 comprises the same components as node 10, the components being designated with the suffix 11. The node 11 further comprises a mass memory 4-11, e.g. one or more hard disks.

Thus, node 10 is considered as a diskless node and node 11 is considered as a diskfull node.

Data may be exchanged between the components of FIG. 1 through a bus system 9-10, respectively 9-11, schematically shown as a single bus for simplification of the drawing. As is known, bus systems may often include a processor bus, e.g. of the PCI type, connected via appropriate bridges to e.g. an ISA bus and/or an SCSI bus.

FIG. 1 depicts two connected nodes.

Figure 2:
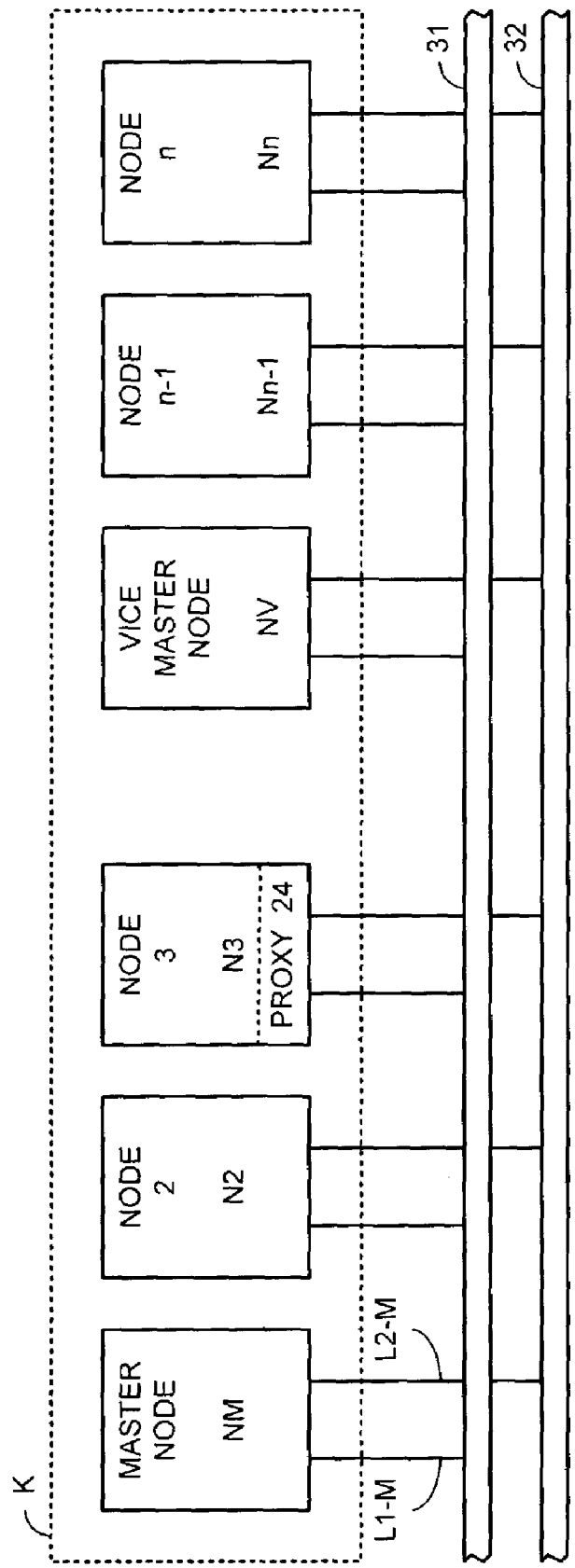
FIG. 2 is a general diagram of a distributed computer system having redundant networks.

FIG. 2 shows an example of a group of nodes noted N* arranged as a cluster K. The cluster has a master node NM, a vice-master node NV and other nodes N2, N3 . . . Nn−1 and Nn. The qualification as master or as vice-master should be viewed as dynamic: one of the nodes acts as the master (resp. Vice-master) at a given time. However, for being eligible as a master or vice-master, a node needs to have the required "master" functionalities. A node being diskfull is considered to have at least partially these master functionalities.

References to the drawings in the following description will use two different indexes or suffixes i and j, each of which may take anyone of the values: {M, V, 2 . . . n}, n+1 being the number of nodes in the cluster.

In FIG. 2, each node Ni of cluster K is connected to a first network 31 via links L1-i. This network 31 is adapted to interconnect this node Ni with another node Nj through the link L1-j. If desired, the Ethernet link is also redundant: each node Ni of cluster K is connected to a second network 32 via links L2-i. This network 32 is adapted to interconnect this node Ni with another node Nj through the link L2-j. For example, if node N2 sends a packet to node Nn, the packet may be therefore duplicated to be sent on both networks. The mechanism of redundant network will be explained hereinafter. In fact, the foregoing description assumes that the second network for a node may be used in parallel with the first network.

Also, as an example, it is assumed that packets are generally built throughout the network in accordance with a transport protocol and a presentation protocol, e.g. the Ethernet Protocol and the Internet Protocol. Corresponding IP addresses are converted into Ethernet addresses on Ethernet network sections.

In a more detailed exemplary embodiment and according to the Internet Protocol, a packet having an IP header comprises identification data as the source and destination fields, e.g. according to RFC-791. The source and destination fields are the IP address of the sending node and the IP address of the receiving node. It will be seen that a node has several IP addresses, for its various network interfaces. Although other choices are possible, it is assumed that the IP address of a node (in the source or destination field) is the address of its IP interface 100 (to be described).

Figure 3:
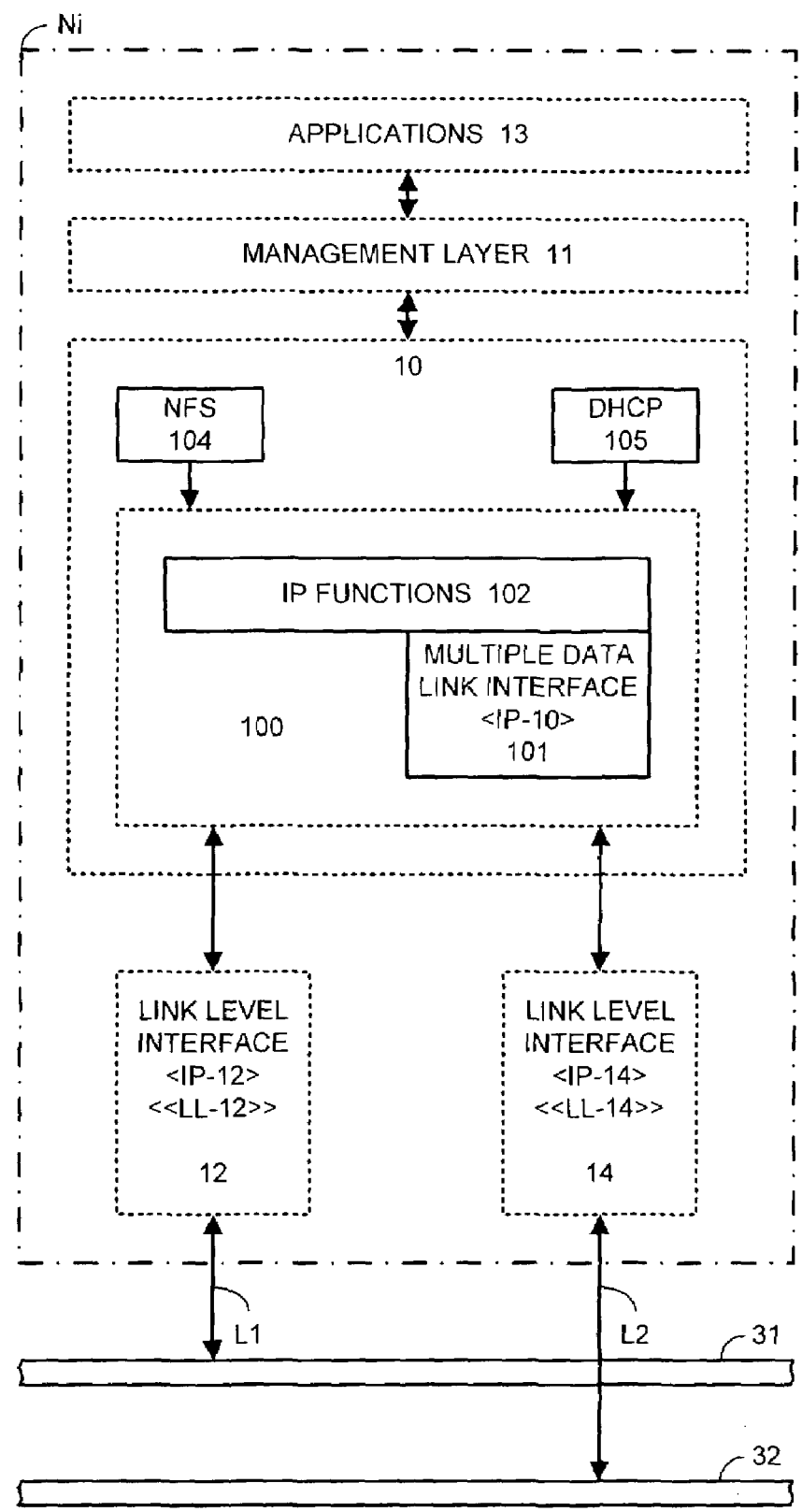
FIG. 3 is a functional diagram of a node using a network protocol according to the invention.

FIG. 3 shows an exemplary node Ni, in which the invention may be applied. Node Ni comprises, from top to bottom, applications 13, management layer 11, network protocol stack 10, and Link level interfaces 12 and 14, respectively connected to network links 31 and 32. Applications 13 and management layer 11 can be implemented, for example, in software executed by the node's CPU 1. Network protocol stack 10 and link level interfaces 12 and 14 can likewise be implemented in software and/or in dedicated hardware such as the node's network hardware interface 7. Node Ni may be part of a local or global network; in the foregoing exemplary description, the network is an Ethernet network, by way of example only. It is assumed that each node may be uniquely defined by a portion of its Ethernet address. Accordingly, as used hereinafter, "IP address" means an address uniquely designating a node in the network being considered (e.g. a cluster), whichever network protocol is being used. Although Ethernet is presently convenient, no restriction to Ethernet is intended.

Thus, in the example, network protocol stack 10 comprises:

an IP interface 100, having conventional Internet protocol (IP) functions 102, and a multiple data link interface 101, above IP interface 100, message protocol processing functions, e.g. an NFS function 104 and/or a DHCP function 105. This DHCP function is adapted to use the DHCP protocol as described in the RFC 2131, March 1997.

Network protocol stack 10 is interconnected with the physical networks through first and second Link level interfaces 12 and 14, respectively. These are in turn connected to first and second network channels 31 and 32, via couplings L1 and L2, respectively, more specifically L1-i and L2-i for the exemplary node Ni. More than two channels may be provided.

Link level interface 12 has an Internet address <IP_12> and a link level address <<LL_12>>. Incidentally, the doubled triangular brackets (<<. . . >>) are used only to distinguish link level addresses from global network addresses. Similarly, Link level interface 14 has an Internet address <IP_14> and a link level address <<LL_14>>. In a specific embodiment, where the physical network is Ethernet-based, interfaces 12 and 14 are Ethernet interfaces, and <<LL_12>> and <<LL_14>> are Ethernet addresses.

IP functions 102 comprise encapsulating a message coming from upper layers 104 or 105 into a suitable IP packet format, and, conversely, de-encapsulating a received packet before delivering the message it contains to upper layer 104 or 105.

In redundant operation, the interconnection between IP layer 102 and Link level interfaces 12 and 14 occurs through multiple data link interface 101. The multiple data link interface 101 also has an IP address <IP_10>, which is the node address in a packet sent from source node Ni.

References to Ethernet are exemplary, and other protocols may be used as well, both in stack 10, including multiple data link interface 101, and/or in Link level interfaces 12 and 14.

Furthermore, where no redundancy is required, IP layer 102 may directly exchange messages with anyone of interfaces 12,14, thus by-passing multiple data link interface 101.

It will be appreciated that layers 10 and 11 comprise components to provide a highly available link with application layer 13 running on the node. The management layer 11 also comprises a management and monitor entity of the node in the cluster, e.g. a Cluster Membership Monitor (CMM).

Figure 4:
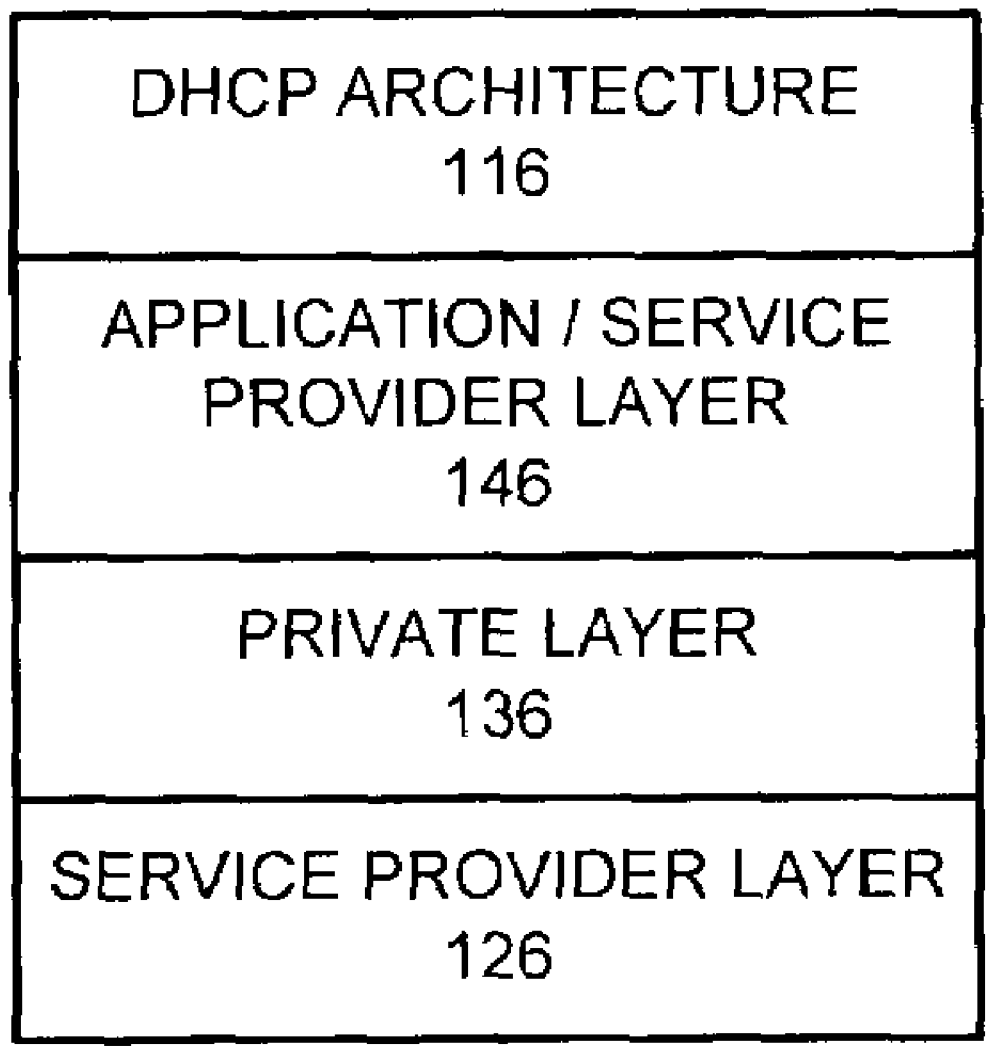
FIG. 4 is an architecture of a protocol as known.

FIG. 4 illustrates an architecture of a DHCP (Dynamic Host Configuration Protocol) function or service which may have a multi-layered architecture. A diskfull node may have such a DHCP function adapted to receive DHCP request from diskless nodes.

The DHCP multi-layered architecture 116 is composed of a service provider layer 126, a private layer 136 and an application/service provider layer 146.

As described in Appendix A-I-1, the service provider layer 126 implements the service provider layer API functions described in Appendix A-I-4, exported by DHCP public modules and consumed by the private layer. Moreover, in Appendix A-I-2, A-I-3 this service provider layer defines the data structure stored in portions of disk accessible from the DHCP function, these portions of disk may be called "container". There may be two types of containers called dhcp containers, the dhcptab container and the dhcp network container. The dhcptab container contains DHCP configuration data. There is only one instance of a dhcptab container maintained in the DHCP service. There can be any number of dhcp network containers, e.g. one for each network supported by the DHCP service. dhcp network containers contain records.

The private layer 136 implements framework-related functions for locating and loading public modules, and provides "consumers API functions" used by consumers of the DHCP service data.

The Application/service provider layer 146 contains all consumers of DHCP service data such as the DHCP server, the administration tools.

A boot of a node is hereinafter describes.

When a new node is inserted in the system at initialization time or at any other time, the node is booted according to its software load configuration parameters. Particularly, this boot enables a diskless node to obtain its address from a diskfull node. In an embodiment, other addresses, e.g. the addresses of the various links of the diskless node, may be calculated from the diskless node's address as described hereinafter. In another embodiment, these other addresses may be also obtained during the boot of a diskless node.

At initialization time, each node executes an initialization software providing various capabilities such as low level hardware configuration, low level hardware tests, operating system loading configuration, boot file configuration. On Sun hardware, such software may be called Open Boot Prom (OBP).

According to the configuration of this initialization software (e.g. OBP), it launches a program to allow diskfull nodes to boot from their local disk or from the network, and to allow diskless nodes to boot from the network only. To boot from the network means to boot from the disk of a remote diskfull node in the network.

In the context of this invention, boot of diskless nodes is particularly considered. When a diskless node boots, its initialization software (e.g. OBP) sends a broadcast request (e.g. DHCP discover) containing an identifier of the node, e.g. its Ethernet address, a board serial number or a MAC address, according to a particular protocol, e.g. DHCP. Thus, all nodes may receive this request. As seen, a diskfull node has a DHCP server adapted to reply to this request by providing its address as the DHCP server,
the file path name of the diskfull node to download the default boot file on the diskless node.

This DHCP server replies also by providing the address, e.g. IP address, of the diskless node. Each data or resources may be contained in portions of disk called DHCP containers.

Several diskfull nodes have a DHCP server adapted to reply to a request of a diskless node, called a client's request. A function exported by a public module of the service provider layer of DHCP allows two DHCP servers to run on two separated diskfull nodes and sharing the same DHCP container.

A diskfull node which reply to the request is considered as the owner diskfull node of the reply for all the associated resources. Problems hay occur when this owner diskfull node fails: the resources owned by this node are unavailable until re-boot of this node. Thus, some diskless nodes may be blocked and/or may be unable to boot when this owner diskfull node fails.

Another limit resides in the fact that the DHCP servers propose, at first boot of a node, a permanent address assignment for client nodes. If a node fails and the node is replaced by another with another identifier, the permanent IP address and the associated files in the DHCP containers are not re-assignable and are lost for the cluster.

The DHCP protocol has still another limit for nodes comprising redundant network interfaces, such as redundant link level interfaces. Thus, the DHCP server assigns independently the address of a first link level interface and of a second link level interface of the same client node.

Figure 5:
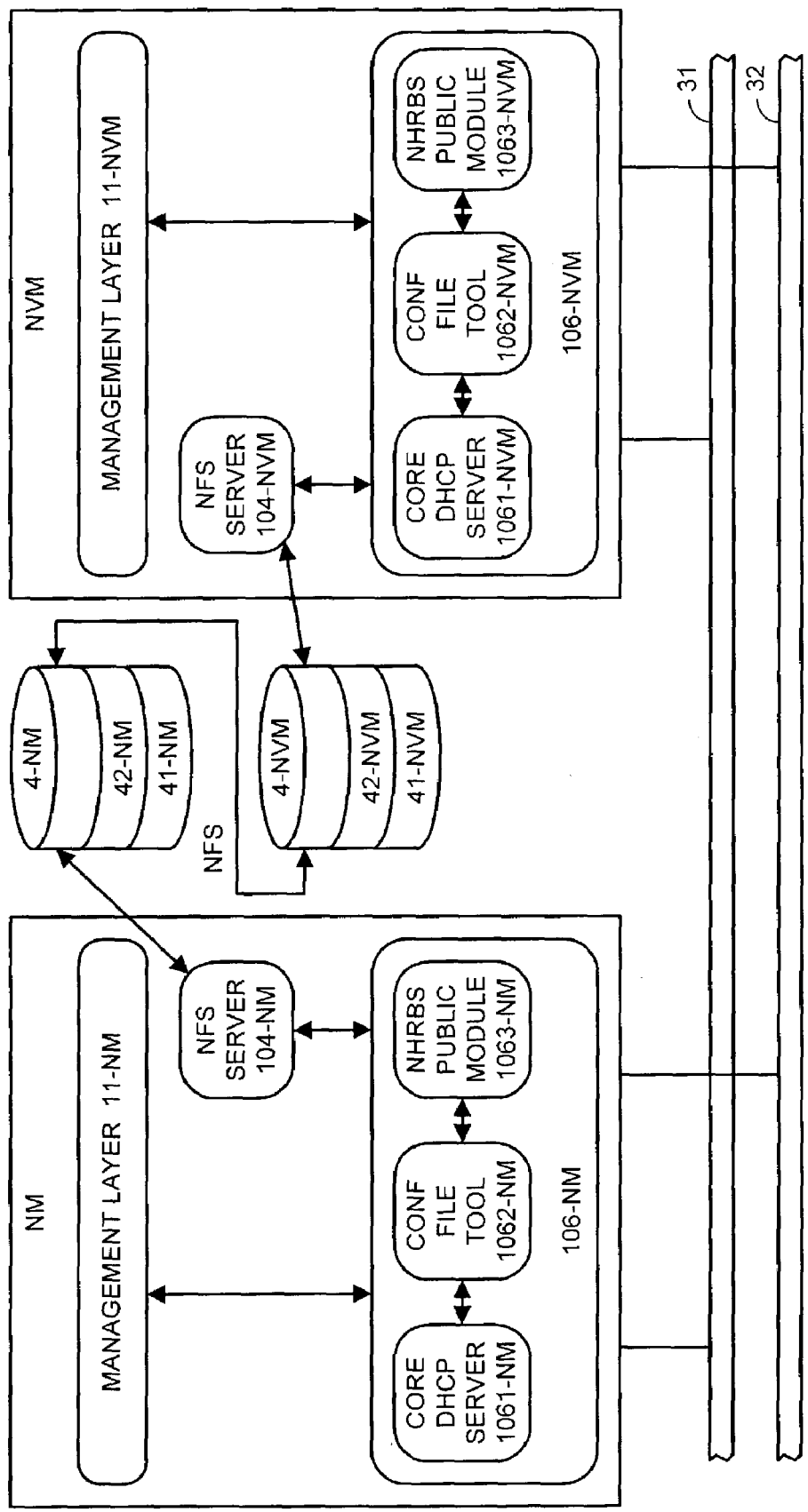
FIG. 5 is a functional diagram of a distributed computer system using a network protocol module according to an embodiment of the invention.

FIG. 5 illustrates a partial cluster comprising two diskfull nodes. As herein above described, diskless nodes have the same structure as a diskfull node without a memory 4 containing containers 41 and 42 as described hereinafter.

Thus, each diskfull node comprises a new DHCP function 106, also called the new DHCP server 106, composed of a core DHCP server 1061, a configuration file tool 1062 and a public module 1063 called e.g. NHRBS public module (Sun Netra Highly Reliable Boot Service). The core DHCP server 1061 corresponds to the known DHCP architecture of FIG. 4. Thus, the configuration file tool 1062 may be part of the Application/Service Provider layer as an administration tool and the public module 1063 may be part of the Service Provider layer.

The configuration file tool 1062 is adapted to configure the core DHCP server so as to use the public module 1063. Then, other DHCP administration tools, as this configuration file tool 1062, may also use the NHRBS public module 1063. This configuration file tool 1062 is adapted to generate a main configuration file in which are given the following information e.g. the name of the public module 1063 to use, the path name of the directory containing the various data containers, the network interfaces to monitor. Moreover, this configuration file tool if adapted to set or to modify values in the main configuration file. An example of a main configuration file generated by the configuration file tool is in Appendix A-II. In this example, the main configuration file containing DHCP service configuration parameters is stored in /etc/inet/dhcpsvc.conf, the RESOURCE line indicates the use of the NHRBS public module called SUNWnhrbs, the path name PATH=/SUNWcgha/remote/var/dhcp indicates the directory containing the various data containers and the INTERFACES line indicates the network interfaces to monitor.

The new public module 1063 is a dynamic library automatically loaded at run-time by the core DHCP server 1061.

The DHCP server 106 is linked to a memory 4 having containers e.g. containers 41, 42, via a NFS server 104 (Network file system). The configuration file tool 1062 indicates the link level interfaces of the diskfull node to which the DHCP server is connected to and that this DHCP server monitors. Thus, one container is designated for each link level interface monitored by the DHCP server. This container is called the network container. It may contain the data corresponding to request received at the link level interface of the diskfull node. Its address may indicate this link level interface address. Indeed, there may be one network container per sub-net managed by the DHCP server. Typically, a single server running on a system equipped with two network interfaces (hme0 and hme1 for example on the Netra systems), can manage two DHCP network containers, one for each interface. In the example of Appendix A-II, the network containers used by the SUNnhrbs module are named: SUNWnhrbsN_A_B_C_D where:

.N is the version of the public module managing the container. (e.g. 1 for NHAS 2.0).

.A_B_C_D is the classical ASCII decimal representation for the sub-net corresponding to the network interface, For example, if interface hme0 is connected to sub-net 10.1.1.0 and hme1 to sub-net 10.1.2.0, the network containers will be named: SUNWnhrbs1_10_1_1_0 and SUNWnhrbs1_10_1_2_0. The content of the network containers used by SUNWnhrbs may be compatible with the ones used by the public module of the service provider layer.

These network containers 41, 42 are used by the new public module 1063 to store data associated in a table T as illustrated in FIG. 6.

The network container 41 may contain entries having different fields such as:

an C-IP field containing the IP address managed by the DHCP server, an C-ID field containing, when the IP address is assigned to a client node, the identifier of the client node, e.g. the MAC address of said node, an S-IP field containing the IP address of the DHCP server owning this entry, e.g. the server which manages it, a flag field being a bit-field containing information concerning the current status for the related entry, e.g. the "type of DHCP lease". The term "lease" designates a given time enabling the use of the C_IP address for a node. The "lease" may be dynamic, meaning that at the end of this given time, the C_IP address corresponding to the "lease" may be renewed if needed. The "lease" may also be permanent, meaning the C_IP address is always assigned to a same node.

Other fields may be added to specify other data related to the entry.

The content of these network containers 41, 42 may be rendered compatible with the containers used for other modules. The dhcp network container and the dhcptab container are configured by the configuration file tool 1062.

An example of dhcp network container configured by the configuration file tool is given in Appendix A-III for the sub-network 10_1_1_0. As described hereinafter, the entry concerning the IP address 10.1.1.10 is manually bound to the node which identifier is 01080020F996DA. An example of dhcptab container is given in Appendix A-IV. This dhcptab container contains definition for macro's and symbols which can be applied to one or more network container entries. This container is not modified by the configuration file tool 1062 of the invention.

The DHCP containers may be dynamically updated by the DHCP server at run-time, e.g. when entries are assigned to client nodes, when the lease is renewed, and by configuration files if configuration changes.

In an embodiment, all the entries are configured for permanent lease for nodes of the cluster. The flag can designate e.g. a permanent lease.

Reverting to FIG. 5, the containers of diskfull nodes may be shared by at least two diskfull nodes, the master node and the vice-master node. The diskfull nodes may use a NFS network (Network File System).

Amongst diskfull nodes, the master NM and vice-master NVM nodes of the cluster are to be designated initially and at every boot of the system. Moreover, when the management layer 11-NM detects the master node NM as failed, the vice-master NVM is designated as the new master node of the cluster. The management layer 11-NVM detects the vice-master node as the current master node. The DHCP server of a node is advantageously linked to the management layer of the node.

Indeed, at initialization time, the NHRBS public module of each diskfull node creates a thread enabling the new DHCP server to be connected to the management layer services to receive cluster membership notifications (MASTER-ELECTED, MEMBER-JOINED, MEMBER-LEFT). When such a notification is received, the new public module 1063 is adapted to take the appropriate action as described in Appendix B-II and hereinafter in the different methods.

Figure 7:
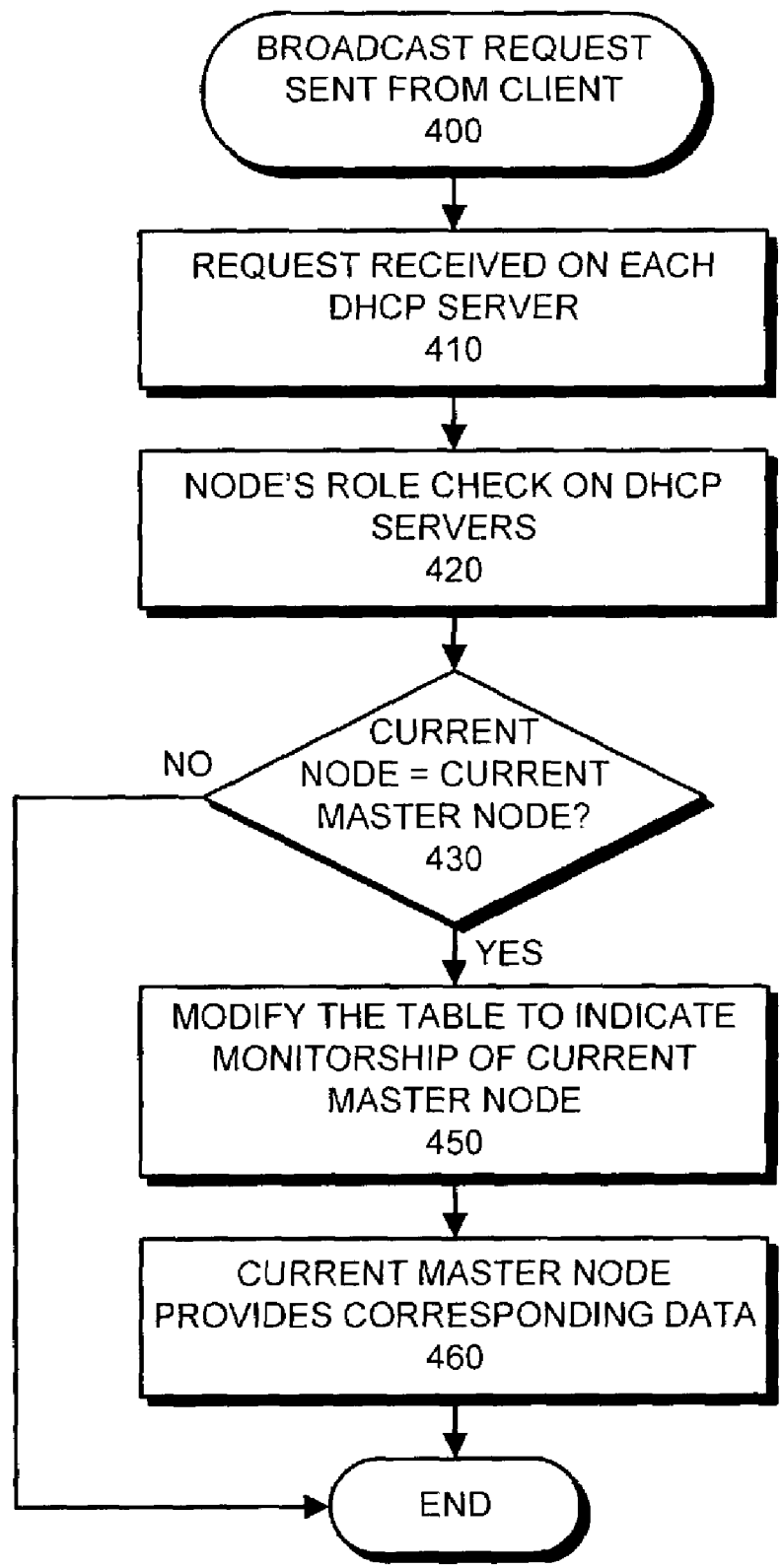
FIG. 7 is a flow-chart of the monitor node according to an embodiment of the invention.

A first method of an embodiment of the invention is illustrated in FIG. 7 when a client node boots and requests for an IP address (operation 400).

Each diskfull node receives the broadcast request (e.g. DHCP DISCOVER) in its DHCP server (operation 410). Each diskfull node has its new DHCP server using the new public module to order the management layer to checks the node's role (operation 420). If the current diskfull node is not the current master node (operation 430), then the flow chart ends. If the current diskfull node is the current master node (operation 430), the table of entries may be modified by the new DHCP server using the new public module to indicate the monitorship of the current master node (operation 450). Thus, the new DHCP server using the new public module of the master current node changes the table of entries by setting all the server IP addresses (S-IP) as being the master node IP-address, such as getting the ownership of all the IP addresses configured. In an embodiment, the master node IP-address may be the multiple data link interface address of the master node. Thus, only the new DHCP server of the current master node replies to the broadcast request by providing the administration data comprising the required IP address C-IP to the node requesting an address (operation 460).

The diskfull node being the vice-master node only receives the broadcast requests and the management layer notifications without replying when receiving them. This process and its corresponding components enables no IP-address (C-IP) to belong to a failed diskfull node.

At initialization time, the ownership of the current master node is done in Appendix B-I which corresponds to an extract from an open_dn( ) API function. The IS_MASTER_INIT_DN_DONE macro checks if master node specific initialization is already done, while the macro IS_MASTER_NODE checks if the current node is the master node. The set_ownership_dn( ) function searches in the given DHCP network container for entries not owned by the current Master node. For every entry found, the entry is updated to be owned by the current Master node.

In Appendix B-II-1, when a MASTER-ELECTED notification is received, the management layer of the node checks the node's role (operation 420). Thus, the table of entries may be modified by the new DHCP server using the new public module to indicate the monitorship of the current master node (operation 450).

Figure 8:
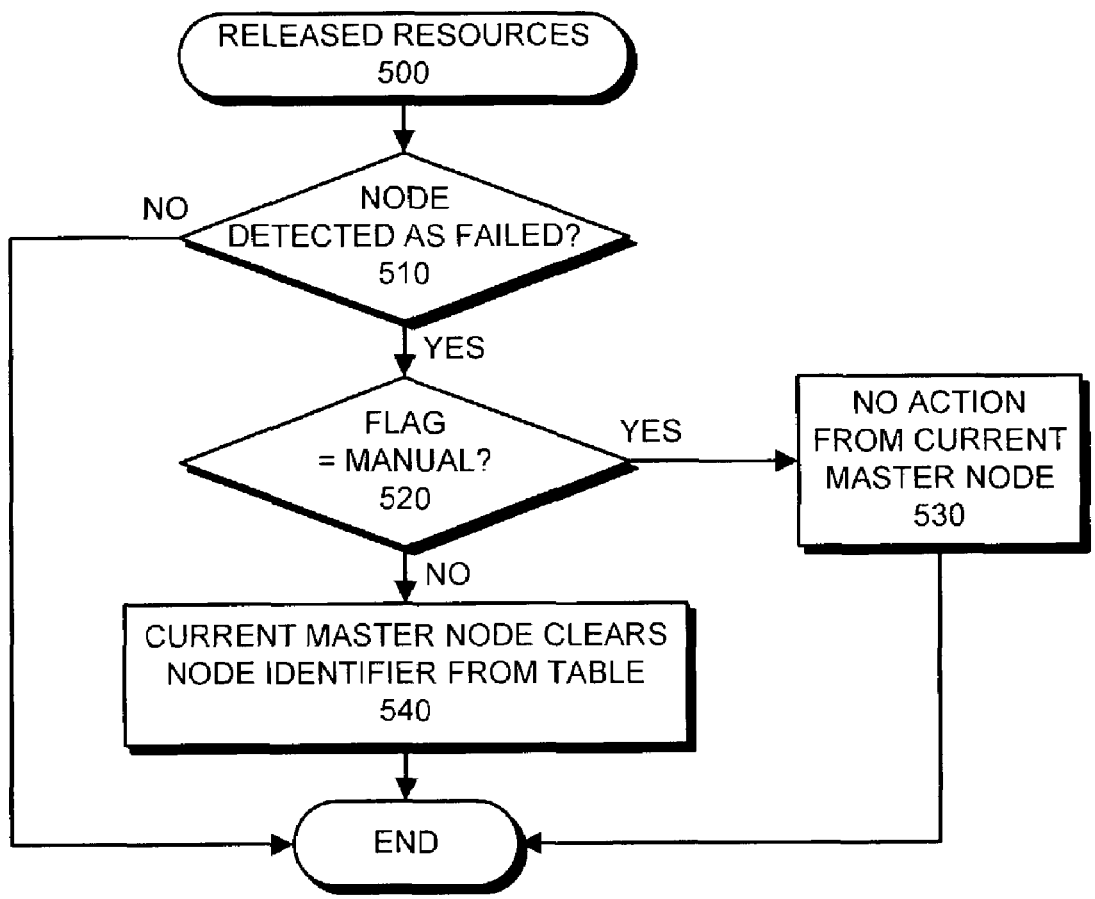
FIG. 8 is a flow-chart of the management of assignment of addresses according to an embodiment of the invention.

A second method of an embodiment of the invention is now illustrated with the flow chart of FIG. 8.

When a node is detected as a failed node (MEMBER-LEFT) (operation 510), the flag value corresponding to the IP-address of said failed node is checked (operation 520). If said flag designates a "manual" value, the current master node does no action for this node (operation 530). This means a user may change manually, e.g. the hardware board and the corresponding identifier. If said flag does not designate a "manual" value, the current master node clears the node identifier from the table and the flag of said entry (operation 540). This operation liberates the resources in the containers corresponding to this entry.

In operation 510, the node may be detected as failed:
when the management layer sends a notification designating a node has left the cluster (shutdown or re-boot),
when the server has provided data to the node requesting to join the cluster and has expected the node to join the cluster in an amount of time; this time has expired; the new public module according to the invention has checked the node presence and has decided the node has failed.

Each time a node leaves the cluster (reboot or shutdown), the notification 'MEMBER LEFT' is received from the management layer by the DHCP server. In this case, the DHCP server (more particularly the NHRBS public module) clears any lease (which may be pending time-out) and proceeds to the notification as described in Appendix B-11-3.

Figure 9:
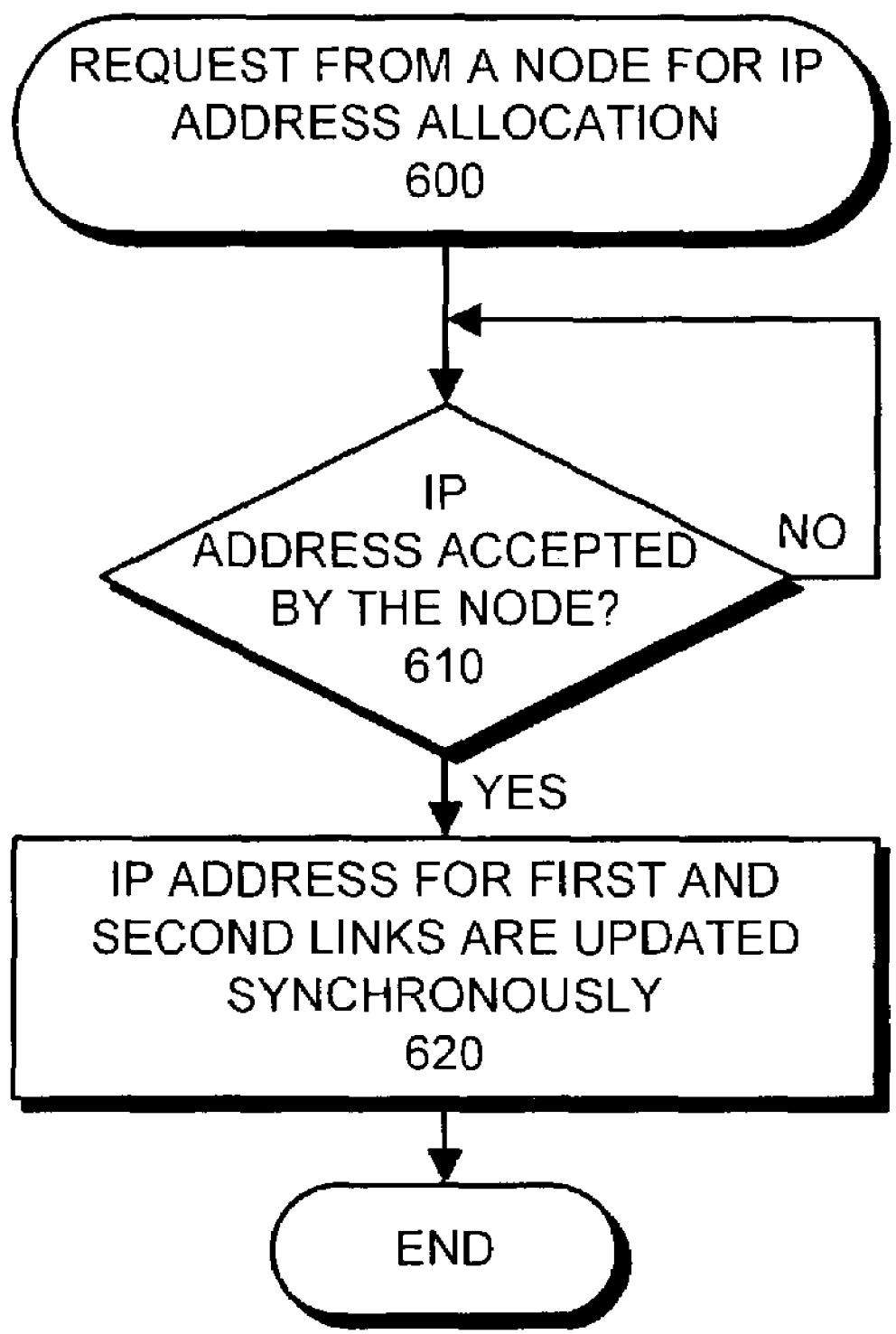
FIG. 9 is a flow-chart of the address synchronization according to an embodiment of the invention.

A third method of an embodiment of the invention is now illustrated with the flow chart of FIG. 9.

The IP address is composed of 4 octet, e.g. 100.1.1.50 according to the version v4:
first octet and second octet 100.1 designate the cluster to which the nodes belongs,
third octet 1 designates the sub-network used by the node,
fourth octet 50 designates the node and is called the host-number.

When receiving a request from a client node for an IP address allocation (operation 600) (MEMBER-JOINED), the master node provides an IP address (C-IP) from a first container for a first link level interface of the client node. If the client node accepts the IP address (operation 610), a mechanism is adapted to synchronize the IP address allocation for both containers. Thus, the second container may be bound to provide a given IP address to the second link level interface of the client node. The second address is calculated by changing the third octet to designate the second network. This address has the same hostnumber as in the IP address of the first link level interface and designates a different sub-net than the IP address of the first link level interface. The first and second containers are updated in a synchronous way (operation 620).

At operation 600, when a client node requesting an address (for example at or after a reboot time), the master node tries to provide only an IP address (C-IP). The mechanism may use an internal cache of managed IP addresses. This cache is used to keep track of the IP address provided to the client node. Thus, the internal cache may provide the same IP address between several re-boots to a given node.

In the case of liberating an IP address, the node which had this IP address may be assigned to the same IP address when it re-boots. This can happen when no other nodes have taken this IP address during the interval between the liberation of address and the re-boot of the node.

The synchronization mechanism at operation 620 is also used if the node left the cluster for example. The DHCP server (using the NHRBS public module) is responsible for maintaining DHCP network containers coherency. As stated above, when an entry is assigned to a first link of a node (or freed) in one network container, an entry has to be assigned to the second link of the same node (or freed) in the other network container.

The DHCP server (using the NHRBS public module) introduces synchronization methods between the network containers. The word "coherency" implies the synchronization mechanism.

Thus, the third octet may be the octet 1 to designate the first link level interface, the octet 2 to designate the second link level interface, the octet 3 to designate that first and second link level interfaces are used in a redundant way. In the last case, the address is divided into two addresses designating the first and second link level interfaces.

The invention is not limited to the herein above-described features.

Thus, other network containers may be used if other link level interfaces are provided for a node.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

Appendix A

A-I- The Service Provider Layer Design

A-I-1 Module provider Notes

A public module must ensure that there are no duplicate container records. That is, there are no records having the identical key field values.

The dhcptab and dhcp network API functions facilitate the creation of a container, query of a container, and the writing of records to a container. These functions take a pointer to a public module-specific handle (opaque to the consumer). This handle is created by the respective open_d? function and destroyed with the close_d? function. Public modules are not required to manage reference counts for open instances. So while individual handles are considered to be MT-safe (and parallel access to containers is suitably protected), an application using the service provider layer API must synchronize close and/or container remove operations among threads such that no threads hold handles to a container after the handle has been closed or the container has been removed.

A public module must provide MT-SAFE access to containers for add, modify, and delete record operations. Developers of public modules may choose to use synchronization services provided by the private layer.

The architecture provides a facility for avoiding record update collisions. The service provider API facilitates the maintenance of data consistency through the use of a per- record update signature, an unsigned 64 bit integer (d?_sig element of the d?_rec_t container record data structure). d?_rec_t records are used throughout the architecture, from consumers through the consumer API and on through to the service provider layer API. Above the service provider layer, the update signature is an opaque object which is not manipulated by users of the consumer API. Module providers should maintain a sequence number (starting at zero (0)) within their per-container header which is increment each time a record is added to that container. We recommend that the first 24 bits of the update signature be set to this value (sequence field). The other 40 bits of the signature is known a the update field.

It isn't a problem if the sequence field rolls over (at 16777215), as long as it begins at zero (0) again.

Public module providers must keep the update field value as part of their data store specific records. When the public module receives a d?_rec_t record through a service provider API function call, it performs a data store-specific lookup to find a record matching the key fields of the d?_rec_t, and compares the signature of the internal record against the argument d?_rec_t. If the signature of the internal record does not match the argument record, then the record has been changed since the consumer acquired it from the public module. In this case, the public module will return DSVC_COLLISION, informing the caller that the record has been changed since it was acquired. If the signatures match, the public module will increment the update field of the argument record before storing the record. New d?_rec_t records are passed through the service provider API with a signature of zero (0). When a public module encounters a new record, it increments the container sequence number, uses that value to set the sequence field of the signature before the record is added to the data store. It isn't a problem if the update field rolls over (at 1099511627776), as long as it begins at zero (0) again. Note that in order for this approach to work, the public module must ensure that updates to the internal records (add, modify, delete) are atomic.

The architecture provides an optional feature for passing public module-specific configuration data to the public module. This feature is implemented as an ASCII string which is passed through the DHCP service management interface and stored on the DHCP server machine. The contents of this string are entirely up to the public module provider. The public module provider should document the format of their ASCII string token to facilitate debugging.

A public module provider must name their module using the following template: ds_NAME.so.CONVER, where NAME is the name of their module and CONVER is the container format version. The provider must prefix their selected name with an internationally known identifier associated with their organization. One example of such an identifier is a stock symbol. Thus, the public modules Sun provides will have names prefixed with SUNW (ds_SUNWnisplus.so.1). By including such an identifier in the module name, we avoid public module name collisions in the /usr/lib/inet/dhcp/svc public module directory. The container format version enables public module providers the ability to produce new revisions of their container formats whenever necessary. In order for container versioning to work, public module providers must include the current container version as part of the container name (e.g. SUNWfiles_dhcptab.1), in order to allow the coexistence of multiple versions of a container. Thus, both the public module name and the containers that public module manipulates must carry the container format version number.

The module provider does not need to be concerned with container version upgrades, as the architecture facilitates the coexistence of different container versions. Furthermore, the administrative tools use this feature of the architecture to enable users to automatically upgrade from one container version to another.

Installation/ upgrade of public module. When public modules are installed, a symbolic link with the same name as the public module less the container version number needs to be created. (e.g. ds_SUNWfiles.so->ds_SUNWfiles.so.1). If the installation detects that this is an upgrade of an existing public module, then the installation program must change this link to point to the new version of the module (e.g. ds_SUNWfiles.so->ds_SUNWfiles.so.2).

A-I-2 dhcptab container related data structures

The dhcptab consists of a list of records containing three fields:

1. Name - This field identifies the record and is used as a search key into the dhcptab container. A Name must consist of ASCII characters. The Name length is limited to 128 characters.
2. Type - This field specifies a single ASCII character type of record and is used as a search key into the dhcptab container.
3. Value - This field contains type-specific ASCII string of information associated with Name..

A-I-3 dhcp network container related data structures

DHICP network containers consist of a list of records containing seven fields:

1. Client identifier - unique octet string which identifies the BOOT/DHCP client. Each octet represents a 4 bit nibble, thus two octets are needed to represent a 8 bit quantity. Thus the number of octets will always be an even value. Unassigned entries have '00'in this field. This field is searchable. It can be up to 64 octets in length.
2. Flags - a single-octet (unsigned) bit field which represents the status of the record. This field is searchable.
3. Client IP address - 4 octets. This field is searchable.
4. Server IP address - 4 octets. This field is searchable.
5. Lease time 4 octets - 32 bit signed number. This field is searchable.
6. Macro name - Contains the ASCII name of a dhcptab container macro. This field is searchable. Its length is limited to 128 characters.
7. Comment - Contains an ASCII string comment. Length is limited to 48 characters..

A-I-4 Provider API

These API functions are exported by public modules. All implementations matching a certain service provider layer API version must follow this specification for the API functions they implement. Later versions of the API must be backward-compatible with earlier versions. This means that additional API calls may be added, but existing ones cannot be changed or deleted.

A-I-4-I dhcptab container API functions

A-I-4-l-1 list dt

Synopsis:
   int list_dt(const char *location, char ***listppp, uint_t *count);

Description:
   Produces a dynamically-allocated list of dhcptab container objects (listppp) found at location and stores the number of list items in count. If no dhcptab container objects exist, then DSVC_SUCCESS is returned, listppp is set to NULL, and count is set to 0.

Returns:
   DSVC_SUCCESS, DSVC_ACCESS, DSVC_NO_LOCATION.

A-I-4-l-2 open dt

Synopsis:
   int open_dt (void **handpp, const char *location, uint_t flags);

Flags: DSVC_CREATE, DSVC_READ, DSVC_WRITE, DSVC_NONBLOCK

Description:
   Creates a new or opens an existing dhcptab container at location and initializes handp to point to the instance handle. When creating a new dhcptab, the caller's identity is used for owner/permissions. Performs any initialization needed by data store. Note that the creation of a dhcptab container as read-only (DSVC_CREATE DSVC_READ) is invalid.

Returns:
   DSVC_SUCCESS, DSVC_EXISTS, DSVC_ACCESS, DSVC_NOENT, DSVC_NO_LOCATION, DSVC_BUSY, DSVC_INTERNAL.

A-I-4-l-3 close dt

Synopsis:
   int close_dt(void **handpp);

Description: Frees instance handle, cleans up per instance state.

Returns: DSVC_SUCCESS, DSVC_ACCESS, DSVC_INTERNAL.

A-I-4-l-4 remove dt

Synopsis:
   int remove_dt (const char *location);

Description:
   Remove dhcptab container in location from data store.
   Returns:
   DSVC_SUCCESS, DSVC_ACCESS, DSVC_NOENT, DSVC_NO_LOCATION, DSVC_BUSY, DSVC_INTERNAL.

A-I-4-l-5 lookup dt

Synopsis:
   int lookup_dt (void *handp, boolean_t partial, uint_t query, int count, const dt_rec_t *targetp, dt_rec_list_t **resultp, uint_t *records);

Description:
   Searches dhcptab container for instances that match the query described by the combination of query and tarqetp. If the partial argument is B_TRUE, then partial query results are acceptable to the caller. Thus, when partial is B_TRUE, any query that returns at least one matching record is considered successful. When partial is B_FALSE, then the query returns success only if it has been applied to the entire container. The query argument consists of 2 fields, each 16 bits long. The lower 16 bits select which fields { key, type} of targetp are to be considered in the query. The upper 16 bits identify whether a particular field value selected in the lower 16 bits must match (bit set) or not match (bit clear). Bits 2-15 in both 16-bit fields are currently unused, and must be set to 0. Useful macros for constructing queries can be found in the private layer The count field specifies the maximum number of matching records to return. A count value of −1 requests that all matching records be returned, regardless of the number. A count value of 0 will result in lookup_dt returning immediately with no data. resultp is set to point to the resulting list of records. If resultp is NULL, then the caller is simply interested in knowing how many records match the query. Note that these records are dynamically allocated, thus the caller is responsible for freeing them. Returns the number of matching records in the records argument. Note that a records value of 0 means that no records matched the query..

Returns:
   DSVC_SUCCESS, DSVC_ACCESS, DSVC_BUSY DSVC_INTERNAL.

A-l-4-l-6 added

Synopsis:
   int added(void *handp, dt_rec_t *new);

Description:
   Add the record new to the dhcptab container referred to by handp. The signature associated with new is updated by the underlying public module. If an update collision occurs, no update to data store is done. Caller is responsible for freeing any dynamically allocated arguments.

Returns
   DSVC_SUCCESS, DSVC_ACCESS, DSVC_BUSY, DSVC_INTERNAL, DSVC_EXISTS.

A-I-4-l-7 modify dt

Synopsis:
   int modify_dt (void *handp, const dt_rec_t *origp, dt_rec_t *new);

Description:
   Atomically modify the record origp with the record new in the dhcptab container referred to by handp. The signature associated with new is updated by the underlying public module. If an update collision occurs, no update to data store is done. Caller is responsible for freeing any dynamically allocated arguments.

Returns
DSVC_SUCCESS, DSVC_ACCESS, DSVC_BUSY, DSVC_COLLISION, DSVC_INTERNAL, DSVC_NOENT.

A-I-4-1-8 delete dt

Synopsis:
int delete_dt(void *handp, const dt_rec_t *dtp);

Description:
Delete the record identified by the key, type and dt_sig fields of dtp from the dhcptab container referred to by the handle handp. If an update collision occurs, no deletion of the matching record is done, and DSVC_COLLISION is returned. Caller is responsible for freeing any dynamically allocated arguments. If the dtp signature (dt_sig) is 0, the matching record is simply deleted with no detection of update collisions.

Returns:
DSVC_SUCCESS, DSVC_ACCESS, DSVC_NOENT, DSVC_BUSY, DSVC_INTERNAL, DSVC_COLLISION.

A-I-4-2 DHCP network container API functions

A-I-4-2-1 list dn

Synopsis:
int list_dn(const char *location, char ***listppp, uint_t *count);.

Description:
Produces a dynamically-allocated list of dhcp network container objects (listppp) found at location and stores the number of list items in count. If no dhcp network container objects exist, then DSVC_SUCCESS is returned, listppp is set to NULL, and count is set to 0.

Returns:
DSVC_SUCCESS, DSVC_ACCESS, DSVC_NO_LOCATION.

A-I-4-2-2 open dn

Synopsis:
int open_dn(void **handpp, const char *location, uint_t flags, const struct in_addr *netp, const struct in_addr *maskp);

Flags:
DSVC_CREATE, DSVC_READ, DSVC_WRITE, DSVC_NONBLOCK

Description:
Creates a new or opens an existing dhcp network container specified by netp and maskp (both host order) in location and initializes handpp to point to the instance handle. Performs any initialization needed by data store. New containers are created with the identity of the caller. Note that the creation of a dhcp network container that is read-only (DSVC_CREATE |DSVC_READ) is invalid.

Returns:
DSVC_SUCCESS, DSVC_EXISTS, DSVC_ACCESS, DSVC_NOENT, DSVC_NO_LOCATION, DSVC_BUSY, DSVC_INTERNAL, DSVC_UNSUPPORTED.

A-I-4-2-3 close dn

Synopsis:
int closedn(void **handpp);

Description:
Frees instance handle, cleans up per instance state.

Returns:
$DSVC_{SUCCESS,\ DSVC\_}$ACCESS, DSVC_INTERNAL.

A-I-4-2-3 remove dn

Synopsis:
int remove_dn(const char *location, const struct in_addr *netp);

Description:
Remove DHCP network container netp (host order) in location.

Returns:
SVC_SUCCESS, DSVC_ACCESS, DSVC_NOENT, DSVC_NO_LOCATION, DSVC_BUSY, DSVC_INTERNAL.

A-I-4-2-5 lookup dn

Synopsis:
int lookup_dn(void *handp, boolean_t partial, uint_t query, mt count, const $dn\_rec_{\_t\ *targetp,\ dn\_}$rec_list_t **resultp, uint_t *records);.

Description:
Searches DHCP network container for instances that match the query described by the combination of query and targetp. If the partial argument is B_TRUE, then partial query results are acceptable to the caller. Thus, when partial is B_TRUE, any query that returns at least one matching record is considered successful. When partial is B_FALSE, then the query returns success only if it has been applied to the entire container. The query argument consists of 2 fields, each 16 bits long. The lower 16 bits select which fields { client id, flags, client IP, server IP, expiration, macro, or comment}of targetp are to be considered in the query. The upper 16 bits identify whether a particular field value selected in the lower 16 bits must match (bit set) or not match (bit clear). Bits 7-15 in both 16-bit fields are currently unused, and must be set to 0. Useful macros for constructing queries can be found at private layer. The count field specifies the maximum number of matching records to return. A count of-I requests that all matching records be returned, regardless of the number. A count of 0 will result in lookup_dn returning immediately. resultp is set to point to the resulting list of records. If resultp is NULL, then the caller is simply interested in knowing how many records match the query. Note that these records are dynamically allocated, thus the caller is responsible for freeing them. Returns the number of matching records in the records argument. Note that a records value of 0 means that no records matched the query.

Returns:
DSVC_SUCCESS, DSVC_ACCESS, DSVC_BUSY, DSVC_INTERNAL.

A-l-4-2-6 add dn

Synopsis:
int add_dn(void *handp, dn_rec_t *new);

Description:
Add the record new to the dhcp network container referred to by the handle handp. new's signature will be updated by the underlying public module. If an update collision occurs, no update of data store occurs.

Returns:
DSVC_SUCCESS, DSVC_ACCESS DSVC_BUSY, DSVC_INTERNAL, DSVC_EXISTS.

A-I-4-2-7 modify dn

Synopsis:
int modify_dn(void *handp, const dn_rec_t *origp, dn_rec_t *new);

Description:
Atomically modify the record origp with the record new in the dhcp network container referred to by the handle handp. new's signature will be updated by the underlying public module. If an update collision occurs, no update of data store occurs.

Returns:
DSVC_SUCCESS, DSVC_ACCESS, DSVC_BUSY, DSVC_COLLISION, DSVC_INTERNAL, DSVC_NOENT.

A-I-4-2-8 delete dn

Synopsis:
int delete_dn(void *handp, const dn_rect_t *pnp);

Description:
Delete the record identified by the dn_cip and dn_sig elements of pnp from the dhcp network container referred to by the handle handp. If an update collision occurs, no deletion of the matching record is done, and DSVC_COLLISION is returned. Caller is responsible for freeing any dynamically allocated arguments. If the pnp dn_sig is 0, the matching record is simply deleted with no detection of update collisions.

Returns:
DSVC_SUCCESS, DSVC_ACCESS, DSVC_NOENT, DSVC_BUSY, DSVC_INTERNAL, DSVC_COLLISION. A-II Example of Configuration file
$ cat /etc/inet/dhcpsvc.conf
DAEMON_ENABLED= TRUE
RUN_MODE= server
RESOURCE= SUNWnhrbs
PATH=/SUNWcgha/remote/var/dhcp
CONVER=1
INTERFACES=hme0, hme I
OFFER_CACHE_TIMEOUT=30

A-III Example of Dhcp network container
$ cat /SUNWcgha/remote/var/dhcp/SUNWnhrbs110_1_
1$_1$_0
SUNWnhrbs1_10_1$_{13}$1_0#
Do NOT edit this file by hand -- use pntadm(1M) or dhcpmgr (1M) instead#
10.1.1.12 |00|01|10.1.1.1|4294967295|277449884543693-6197|pn12|netra-t1-9
10.1.1.11|00|01|10.1.1.1|4294967295|277449884543693-6198|pn11|netra-t1-8
10.1.1.10|01|080020F996DA|01|10.1.1.1|4294967295|13-030884046 819819544|pn10|netra-t1-7

A-IV Example of Dhcptab container
$cat /SUNWcgha/remote/var/dhcp/SUNWnhrbs_dhcptab
SUNWnhrbs1_dhcptab

Do NOT edit this file by hand -- use dhtadm(1M) or dhcpmgr (1M) instead

Locale|m|1535896357919365529 7|:\
:UTCoffst=-18000:\

BootSrvA=10.1.1.1\
BootSrvN="cgtp-master-link-a":\
Subnet=255.255.255.0:

pn10|m|2508223517468655617|\
:Include=Locale:\
:BootFile="inetboot.sun4u.Solaris_8":\
:SrootNM="cgtp-master-link-a":\
:SrootIP4 =10 .1.1.1:\
:SrootPTH="/export/home/client/netra-t1-7/rootrI":\
:SswapPTH="/export/home/client/netra-t1-7/swap":\
:SswapIP4=10.1.1.1:\
:Broadcst=10.1.1.255:\
:Router=10.1.1.1:
\
pn11|m|3894769252745347073|:\
:Include=Locale:\
:BootFile="inetboot.sun4u.Solaris_8":\
:SrootNM="cgtp-master-link-a":\
:SrootIP4=10.1.1.1:\
:SrootPTH="/export/home/c1ient/netra-t1-8/root":\
:SswapPTH="/export/home/client/netra-t1-8/swap":\
:SswapIP4=10 .1.1.1:\
:Broadcst=10 .1 .1.255:\
:Router=10. 1.1.1:

SbootFTL|s|11187222949365022721 |
Vendor=SUNW.UltraSPARC-IIi-cEngine, 7,ASCII, 1,0
SswapPTH|s |15424547248767238145 |
Vendor=SUNW.UltraSPARC-IIi-cEngine, 6,ASCII, 1,0
SswapIP4 |s |6900077579085021185 |Vendor=SUNW.UltraSPARC-IIi-cEngine, 5, IP, 1,0
SrootPTH|s |5589811562496917505 |Vendor=SUNW.UltraSPARC-IIi-cEngine, 4,ASCII, 1,0
SrootNM|s |17526602374842417153 |
Vendor=SUNW.U1traSPARC- IIi-cEngine, 3,ASCII, 1,0
SrootIP4 |s |11261813 81819334657 |
Vendor=SUNW.U1traSPARC-IIi-cEngine, 2, IP, 1,1
SrootOpt|s |9453337092827381761 |
Vendor=SUNW.U1traSPARC-IIi-cEngine, 1,ASCII, 1,0

Appendix B

B-I Extract of open-dn( )
if (!IS_MASTER_INIT_DN_DONE(subnet) && IS_MASTER_NODE( )) {
retval= set_ownership_dn(dhp);
if(retval !=DSVC_SUCCESS) {
(void) free(dhp);
return (retval);
}

B-II RBS NOTIFY CALLBACK( )
static cmm_cmchanges_t cmc_filter={
CMM_MASTER_ELECTED,
CMM_MEMBER_JOINED,
CMM_MEMBER_LEFT
};
static int rbs_master_notif(char *location);
static int rbs_left_notif(char *location, cmm_nodeid_t node_id);

extern cmm_member_t local_member;

```
extern cmm_nodeid_t local_nodeid;
extern pid_t my_proc_pid;
extern int master_init;
extern mutex_t to_mtx, lk_mtx;
extern int errno;
extern lk_entry_t *lk_list;
extern int valid_to;
/*
 * callback called by CMM dispatcher when a Cluster
    Membership notification
 * is received.
 */
static void
rbs_notify_callback(const        cmm_cmc_notification_t
    *notif, void *client_data)
{
char *location=(char *)client_data;
cmm_member_t member;
cmm_error_t cmm_error;

/* reload local node information from CMM */
    cmm_error=cmm_member_getinfo(local_nodeid,
        &local_member);
    if(cmm_error !=CMM_OK)
        rbs_log("CMM", 3, "cmm_member_getinfo( ) failed
            (%d)",
            cmm_error);
        rbs_log("CMM", 7, "%s running on Master node
            (sflag=0x%x)",
            IS_MASTER_NODE( ) ?"I am": "NOT", local_mem-
                ber.sflag);
        switch (notif-> cmchange) {

B-II-1 CMM MASTER ELECTED
case CMM_MASTER_ELECTED:
    cmm_error=cmm_master_getinfo(&member);
    if (cmm_error ==CMM_OK)
        rbs_log("CMM",  7,  "New  Master  elected=%d
            (addr=%s)",
            notif-> nodeid, member.addr);
    else
        rbs_log("CMM", 7, "New Master elected=%d. No
            Master information available",
            notif-> nodeid);
    /*
     * Check if we are running on the new elected Master. In
        this
     * case, we must take the ownership of all IP addresses in
     * all network containers.
     *1
        if(notif-> nodeid == local_nodeid) {
            if (rbs_master_notif(location))
                thr_must_exit= TRUE;
        }
        break;

B-II-2 CMM MEMBER JOINED
case CMM_MEMBER_JOINED:
    if(cmm_member_getinfo(notif->     nodeid,    &member)
        ==CMM_OK) {
        rbs_log("CMM", 7, "New member in cluster=%d
            (addr=%s)",
            notif->nodeid, member.addr);
    }
    if (IS_MASTER_NODE( )
    /* Remove timeout from list */
        (void) remove_timeout(notif-> nodeid);
        break;

B-II-3 MEMBER LEFT THE CLUSTER
case CMM_MEMBER_LEFT:
    rbs_log("CMM", 7, "Member left cluster=%d", notif-
        >nodeid);
    if (IS_MASTER_NODE ( ))
    /* Remove timeout from list */
        (void) remove_timeout(notif->nodeid);
    /*
     * Clean-up assigned entries in network containers. Must
        be
     * done only if running on the Master node.
     */
        if (IS_MASTER_NODE( ))
            rbs_left_notif(location, notif-> nodeid);
        break;
    default:
        rbs_log("CMM", 7, "Other notification=0x%x",
            notif ->emchange);
        break;
}
}
```

What is claimed is:

1. A distributed computer system comprising a group of nodes, said group of nodes having a first and a second node adapted to act as current monitor nodes, each node of the group of nodes having an identifier and a management layer being informed which node currently acts as the current monitor node, each first and second node comprising:

a protocol server adapted to associate and to send an address to a node requesting an address in the group of nodes, wherein the protocol server of the current monitor node is adapted to permanently associate an address to a node requesting an address, wherein the protocol server is adapted to liberate the permanently associated address when the management layer of the current monitor node detects as down said node, and wherein the protocol server of the current monitor node is adapted to associate a first address to a first link of a node and to associate a second address to a second link of this node, first and second addresses comprising four octet having three identical octet to designate the same node, the fourth octet being adapted to designate the first and second links;

a memory adapted to store an association address-identifier of a node requesting an address;

wherein the protocol server of the current monitor node is further adapted to designate an association of address-identifier of a node in the list to permit manual change of the identifier in case of change of the identifier of said node;

wherein the protocol server of the current monitor node is adapted to associate a third address to a node comprising four octet with three identical octet to first and second addresses, said third address indicating first and second addresses are used in a redundant manner; and wherein the protocol server being further capable of,
    requesting the management layer of a node for an indication informing if said node acts as the current monitor node,
    attributing, to the current monitor node, the ownership of a list of associations, said list comprising associations of the memory of first node shared with associations of the memory of second node.

2. The distributed computer system of claim 1, wherein the protocol server is adapted to cooperate with an internal cache in order to store the address provided to the requesting node and in order to supply this address responsive to a request of the same requesting node after a re-boot.

3. The distributed computer system of claim 1, wherein the protocol server comprises an address management module adapted to provide the address services as claimed in the preceding claims.

4. The distributed computer system of claim 1, wherein the protocol server is capable to be configured by a configuration file tool so as to use the address management module.

5. A method of managing a distributed computer system having a group of nodes, each node having an identifier, and comprising a first and a second node being adapted to act as the current monitor node of the group of nodes, wherein the method comprises the following steps:

a. requesting for an indication informing which one of the first or the second node acts as the current monitor node;

b. attributing, to the current monitor node, the ownership of a list of associations address-identifier of nodes, this list comprising the associations from the first and second nodes;

c. responsive to a reception of a request for an address of a requesting node in the first and the second nodes, associating and sending an address to the requesting node from the current monitor node; wherein step c. comprises permanently associating an address to a node requesting an address, wherein step c. further comprises liberating this address when the current monitor node detects as down said node, and wherein step c. further comprises associating a first address to a first link of a node and associating a second address to a second link of this node, first and second addresses comprising four octet having three identical octet to designate the same node, the fourth octet being adapted to designate the first and second link; wherein step c. further comprises designating an association of address-identifier of a node in the list to permit manual change of the identifier in case of change of the identifier of said node; and wherein the step c. comprises associating a third address to a node comprising four octet with three identical octet to first and second addresses, said third address indicating first and second addresses are used in a redundant manner;

d. repeating steps a. to step c.

6. The method of claim 5, wherein step c. comprises storing the address provided to the requesting node and supplying this address responsive to a request of the same requesting node after a re-boot.

7. The method of claim 5, wherein the current monitor node is the master node of the group of nodes.

8. A computer-readable storage medium storing instructions that when executed by a computer cause the computer to perform a method for managing a distributed computer system having a group of nodes, each node having an identifier, and comprising a first and a second node being adapted to act as the current monitor node of the group of nodes, wherein the method comprises the following steps:

a. requesting for an indication informing which one of the first or the second node acts as the current monitor node;

b. attributing, to the current monitor node, the ownership of a list of associations address-identifier of nodes, this list comprising the associations from the first and second nodes;

c. responsive to a reception of a request for an address of a requesting node in the first and the second nodes, associating and sending an address to the requesting node front the current monitor node wherein step c. comprises permanently associating an address to a node requesting an address, wherein step c. further comprises liberating this address when the current monitor node detects as down said node, and wherein step c. further comprises associating a first address to a first link of a node and associating a second address to a second link of this node, first and second addresses comprising four octet having three identical octet to designate the same node, the fourth octet being adapted to designate the first and second link; wherein step c. further comprises designating an association of address-identifier of a node in the list to permit manual change of the identifier in case of change of the identifier of said node; and wherein the step c. comprises associating a third address to a node comprising four octet with three identical octet to first and second addresses, said third address indicating first and second addresses are used in a redundant manner;

d. repeating steps a. to step c.

* * * * *

UNITED STATES PATENT AND TRADEMARK OFFICE
CERTIFICATE OF CORRECTION

PATENT NO. : 7,243,142 B2  Page 1 of 1
APPLICATION NO. : 10/354334
DATED : July 10, 2007
INVENTOR(S) : Poirot et al.

It is certified that error appears in the above-identified patent and that said Letters Patent is hereby corrected as shown below:

In claim 8 (at column 22, line 21), delete the word, "front" and replace with the word --from--.

In claim 8 (at column 22, line 31), delete the word, "link" and replace with the word --links--.

Signed and Sealed this

Fourteenth Day of August, 2007

JON W. DUDAS
*Director of the United States Patent and Trademark Office*